US007253545B2

(12) United States Patent
Colgrove et al.

(10) Patent No.: US 7,253,545 B2
(45) Date of Patent: Aug. 7, 2007

(54) VIBRATORY SCREENING MACHINE WITH SINGLE MOTOR MOUNTED TO PRODUCE LINEAR MOTION

(75) Inventors: James R. Colgrove, Holland, NY (US); Anthony J. Lipa, Williamsville, NY (US)

(73) Assignee: Derrick Corporation, Buffalo, NY (US)

(*) Notice: Subject to any disclaimer, the term of this patent is extended or adjusted under 35 U.S.C. 154(b) by 6 days.

(21) Appl. No.: 10/998,886

(22) Filed: Nov. 29, 2004

(65) Prior Publication Data

US 2005/0072896 A1 Apr. 7, 2005

Related U.S. Application Data

(62) Division of application No. 10/103,960, filed on Mar. 22, 2002, now Pat. No. 6,827,223.

(51) Int. Cl.
*H02K 5/00* (2006.01)
*F16M 1/00* (2006.01)
*B07C 5/04* (2006.01)

(52) U.S. Cl. ........................ 310/91; 248/637; 248/674; 209/634

(58) Field of Classification Search .................. 310/91, 310/81; 248/637, 674; 209/364
See application file for complete search history.

(56) References Cited

U.S. PATENT DOCUMENTS 1,620,575 A 3/1927 Schadel
1,621,949 A 3/1927 Overstrom
2,783,841 A * 3/1957 Dargols ........................ 83/574
3,003,635 A 10/1961 Wood
3,089,582 A 5/1963 Musschoot et al.
3,756,407 A 9/1973 Christensen
4,472,980 A * 9/1984 Wadensten ..................... 74/61
5,035,397 A * 7/1991 Yamada ....................... 248/638
5,259,653 A * 11/1993 Jacobsen ..................... 294/33
5,435,516 A * 7/1995 Ogasawara et al. ......... 248/635
5,547,068 A * 8/1996 Spurlin ....................... 198/760
5,718,407 A * 2/1998 Lee ............................ 248/634
6,575,304 B2 6/2003 Cudahy
6,580,189 B2 * 6/2003 Mooney ...................... 310/81

OTHER PUBLICATIONS

ROSTA brochure (undated) 3 sheets.
ROSTA Inc.; *Rubber Suspension Unit; Technology: Oscillating Mounting*; The Blue Ones from ROSTA; Vol-Issue No. T2000.646; Pub. Date: 2000; pp. 20, 21, 27, 48, 60, 61; Rosta Inc., CDN-Uxbridge/Ontario L9P IN5 Canada.

* cited by examiner

*Primary Examiner*—Burton Mullins
*Assistant Examiner*—Erik Preston
(74) *Attorney, Agent, or Firm*—Conley Rose, P.C.

(57) ABSTRACT

Disclosed within is a fist bracket comprising a base and a circumferential portion extending from the base in which the circumferential portion comprises an outer surface and an inner surface and the outer surface comprises a curved section and a planar section. Also disclosed within is a combination of a motor mount bracket and fist bracket comprising a fist bracket with a base and a circumferential portion extending from the base. The circumferential portion includes an outer surface and an inner surface and the outer surface comprises a curved section and a planar section. The combination further includes a bushing disposed within the circumferential portion of the fist bracket.

14 Claims, 5 Drawing Sheets

FIG. 2A
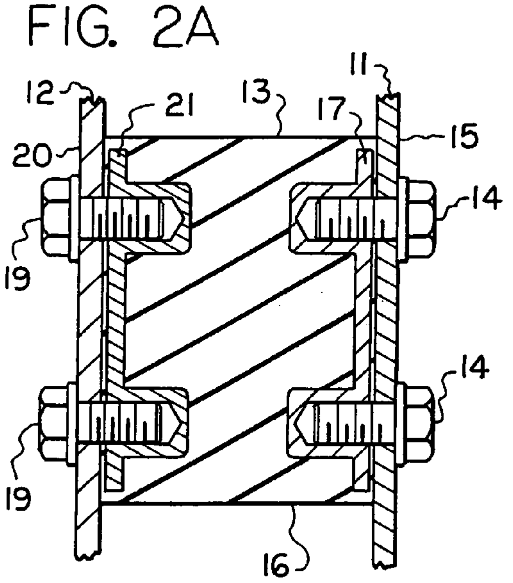
FIG. 5
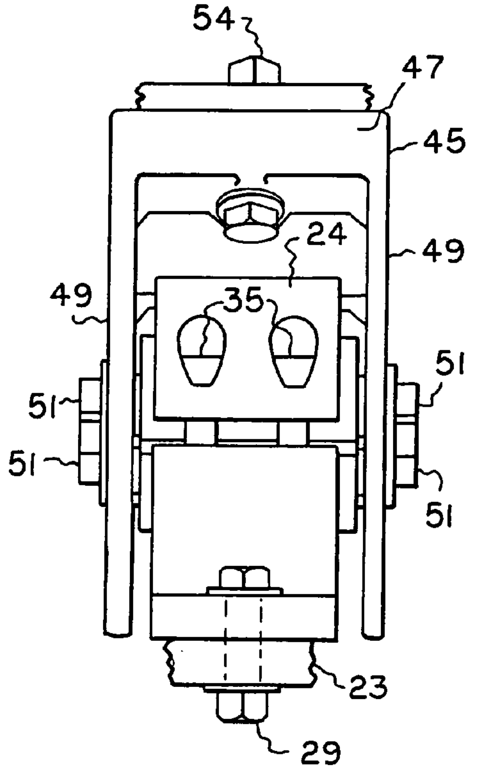
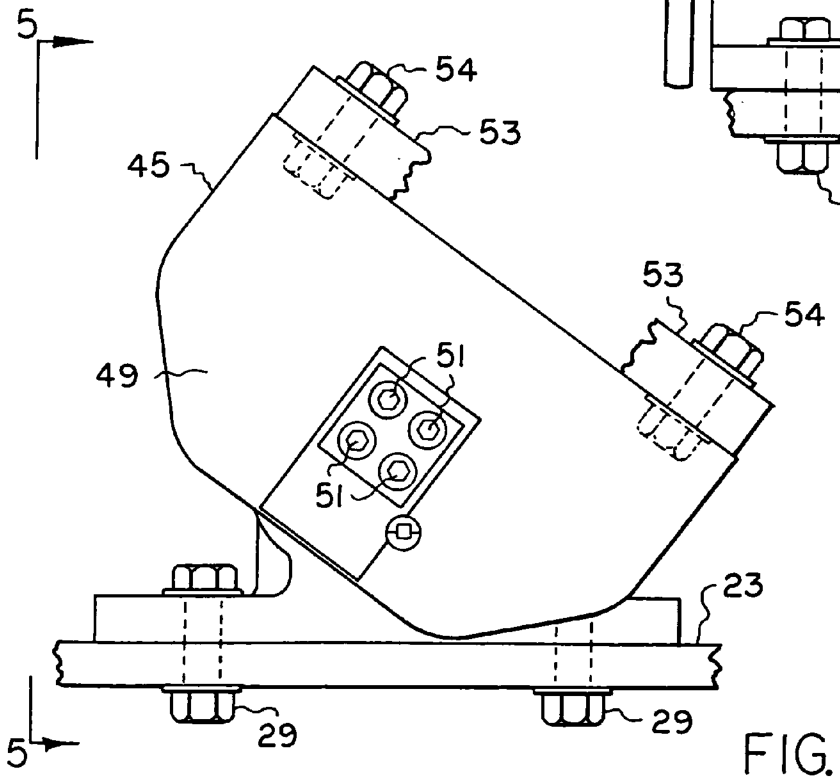
FIG. 4

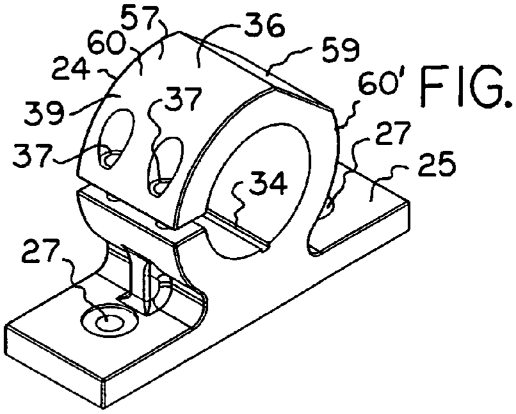
FIG. 6
FIG. 7
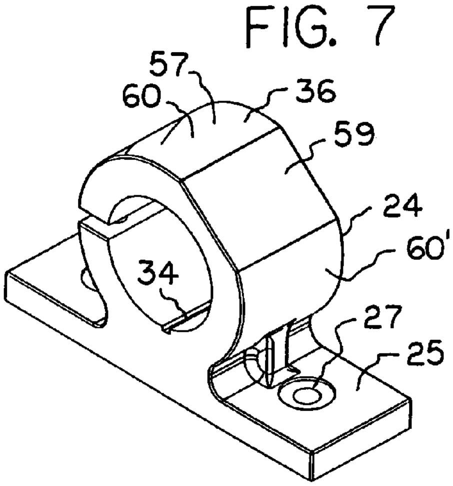
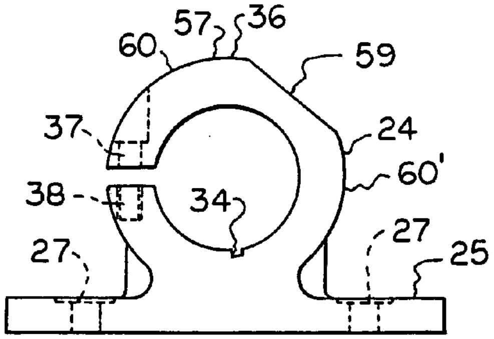
FIG. 8
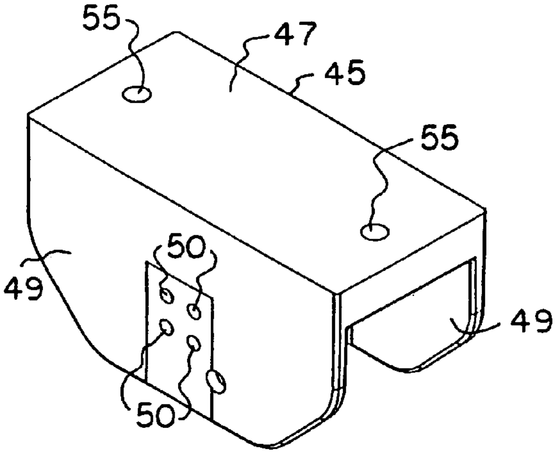
FIG. 9

VIBRATORY SCREENING MACHINE WITH SINGLE MOTOR MOUNTED TO PRODUCE LINEAR MOTION

CROSS-REFERENCE TO RELATED APPLICATIONS

This application is a divisional application of U.S. patent application Ser. No. 10/103,960, filed Mar. 22, 2002 now U.S. Pat. No. 6,827,223 and entitled "Vibratory Screening Machine With Single Motor Mounted to Produce Linear Motion", which is hereby incorporated herein by reference.

STATEMENT REGARDING FEDERALLY SPONSORED RESEARCH OR DEVELOPMENT

Not Applicable

BACKGROUND OF THE INVENTION

The present invention relates to an improved vibratory screening machine which will produce linear motion with only a single vibratory motor which is mounted thereon by unique mounting structure and to components of the unique motor mounting structure.

By way of background, in vibratory screening machines two vibratory motors are utilized in tandem to produce desired linear motion for effecting the vibratory screening operation. As is well known in the art, the two motors are rigidly secured to the resiliently mounted inner frame of the vibratory screening machine. These two motors are operated in opposite directions to thereby produce linear motion for conveying the material which is being screened. Insofar as known, a single motor mounted on a vibratory screening machine always produced orbital motion and was incapable of producing linear motion.

BRIEF SUMMARY OF THE INVENTION

It is accordingly one object of the present invention to provide an improved vibratory screening machine utilizing only a single vibratory motor which is capable of producing linear motion of the screen-carrying inner frame of the machine.

Another object of the present invention is to provide a combined fist bracket and motor mounting bracket structure for mounting a single vibratory motor to provide linear motion.

A further object of the present invention is to provide an improved fist bracket structure for use in a vibratory screening machine mounting a single motor to produce linear motion.

Still another object of the present invention is to provide an improved motor mount bracket for use in a vibratory screening machine mounting a single motor to produce linear motion. Other objects and attendant advantages of the present invention will be readily perceived hereafter.

The present invention relates to a vibratory screening machine comprising an outer frame, an inner frame resiliently mounted on said outer frame, a single vibratory motor having a center of rotation and first and second opposite ends, first and second motor mount structures mounting said first and second opposite ends, respectively, on said inner frame, first and second directionally stiff resilient bushings in said first and second motor mount structures, respectively, and said center of rotation of said vibratory motor being substantially aligned with the direction of said directional stiffness of said first and second resilient bushings.

The present invention also relates to a vibratory screening machine comprising an outer frame, an inner frame having first and second inner frame sides, resilient mounts mounting said inner frame on said outer frame, a single vibratory motor having first and second motor ends, and first and second motor mounting assemblies mounting each of said first and second motor ends, respectively, on said first and second inner frame sides, respectively, said first and second motor mounting assemblies including first and second fist brackets, respectively, bolted to said first and second inner frame sides, respectively, first and second directionally stiff resilient bushings mounted within said first and second fist brackets, respectively, said first and second directionally stiff resilient bushings being inclined with their stiffness attitudes oriented in the conveyance direction of said inner frame, first and second motor mount brackets mounted on said first and second directionally stiff resilient bushings, respectively, and said first and second motor mount brackets mounting said first and second motor ends, respectively.

The present invention also relates to a motor mount bracket and fist bracket combination comprising a fist bracket, a fist bracket base on said fist bracket, a housing on said fist bracket base, a housing wall on said housing, a thinner portion on said housing wall adjacent to a thicker portion of said housing wall, a bushing in said housing wall, a bushing housing on said bushing, a metal block having opposite ends extending outwardly from said housing, resilient members between said bushing housing and said metal block; and a motor mount bracket secured to said fist bracket, a motor mount bracket base on said motor mount bracket, inner and outer sides on said motor mount bracket base, and a pair of substantially parallel sides extending from said motor mount bracket base with each side bolted to one of said ends of said metal block.

The present invention also relates to a fist bracket comprising a base, a housing on said base, a housing wall on said housing, and a thinner portion on said housing wall located between two thicker portions of said housing wall.

The present invention also relates to a motor mount bracket comprising a base, an inner and outer side on said base, a pair of substantially parallel sides extending from said base, said inner side of said base being located within said sides, and a plurality of ribs on said inner side.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 2*a* is a fragmentary cross sectional schematic view of the structure for resiliently mounting the inner frame of the vibratory screening machine on the outer frame;

FIG. 4 is a fragmentary enlarged side elevational view of the improved motor mount structure;

FIG. 5 is an end elevational view of the improved motor mount structure taken substantially in the direction of arrows 5-5 of FIG. 4;

FIG. 6 is a perspective view of the fist bracket showing the open side thereof;

FIG. 7 is a perspective view of the fist bracket showing the thinned circumferential side;

FIG. 8 is a side elevational view of the fist bracket;

FIG. 9 is a perspective view of the motor mount bracket;

DETAILED DESCRIPTION OF THE INVENTION

Figure 1:
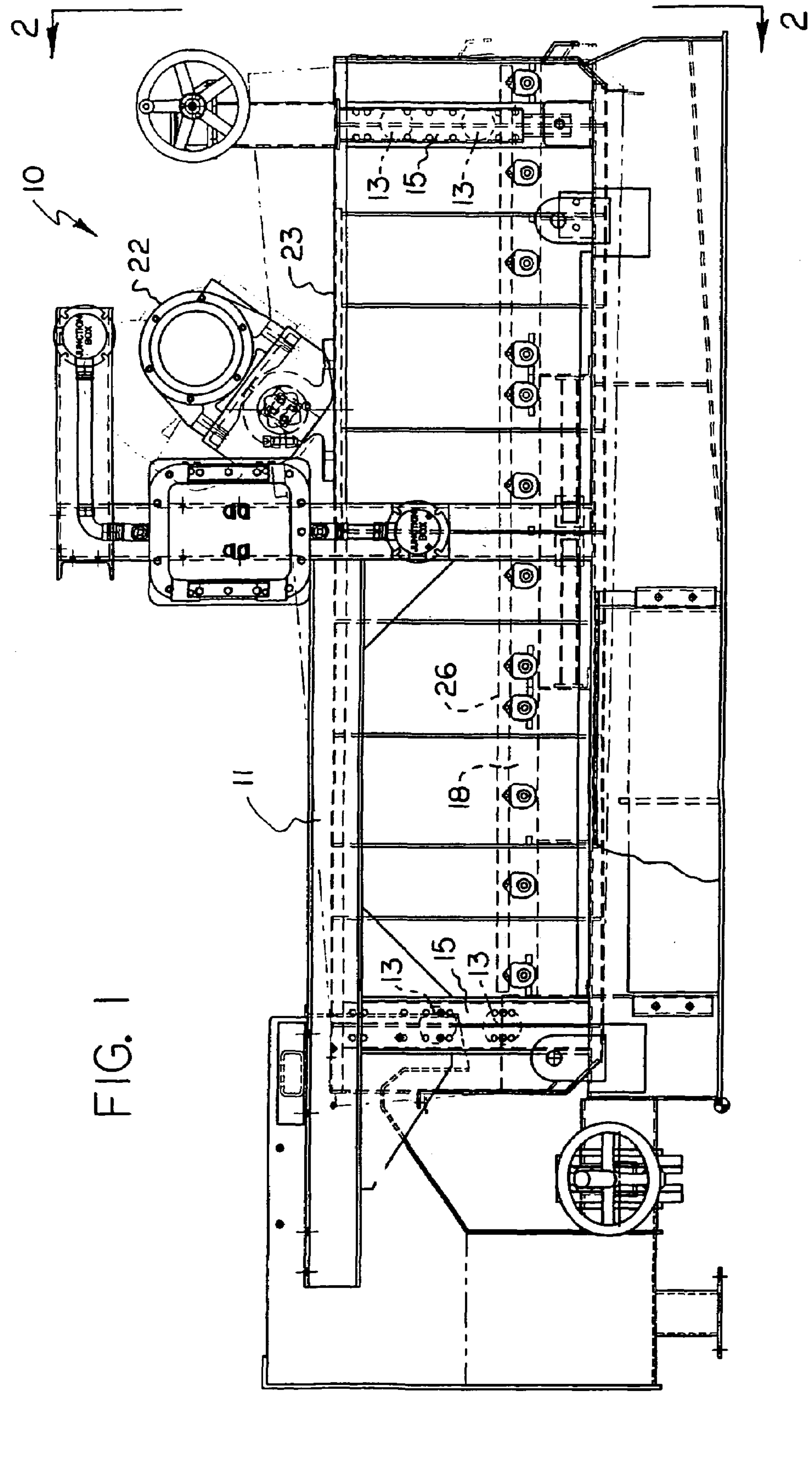
FIG. 1 is a side elevational view of the vibratory screening machine mounting the unique motor mounting structure of the present invention which will cause a single vibratory motor to produce linear motion.
Figure 3:
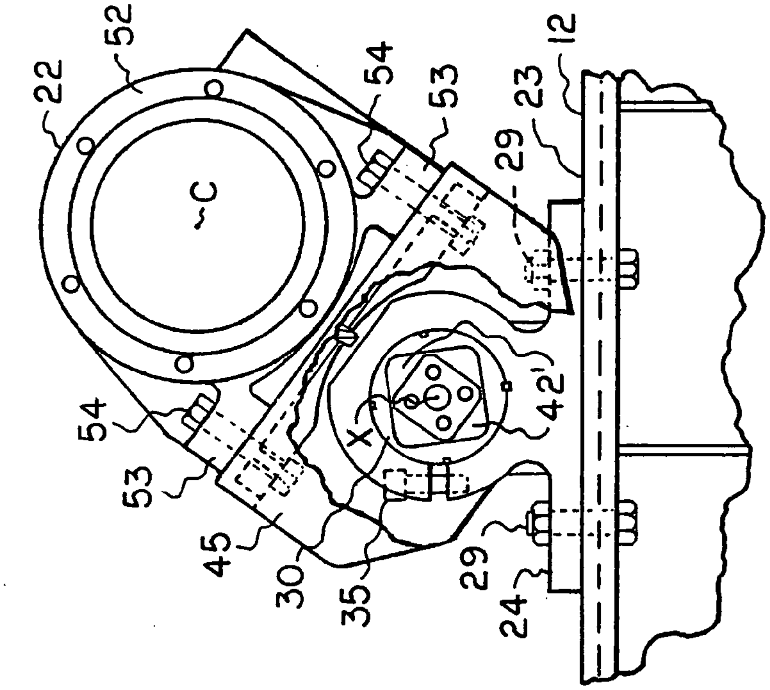
FIG. 3 is an enlarged fragmentary partially broken away side elevational view of the unique motor mount structure of the present invention mounting the vibratory motor onto the inner frame of the vibratory screening machine.
Figure 2:
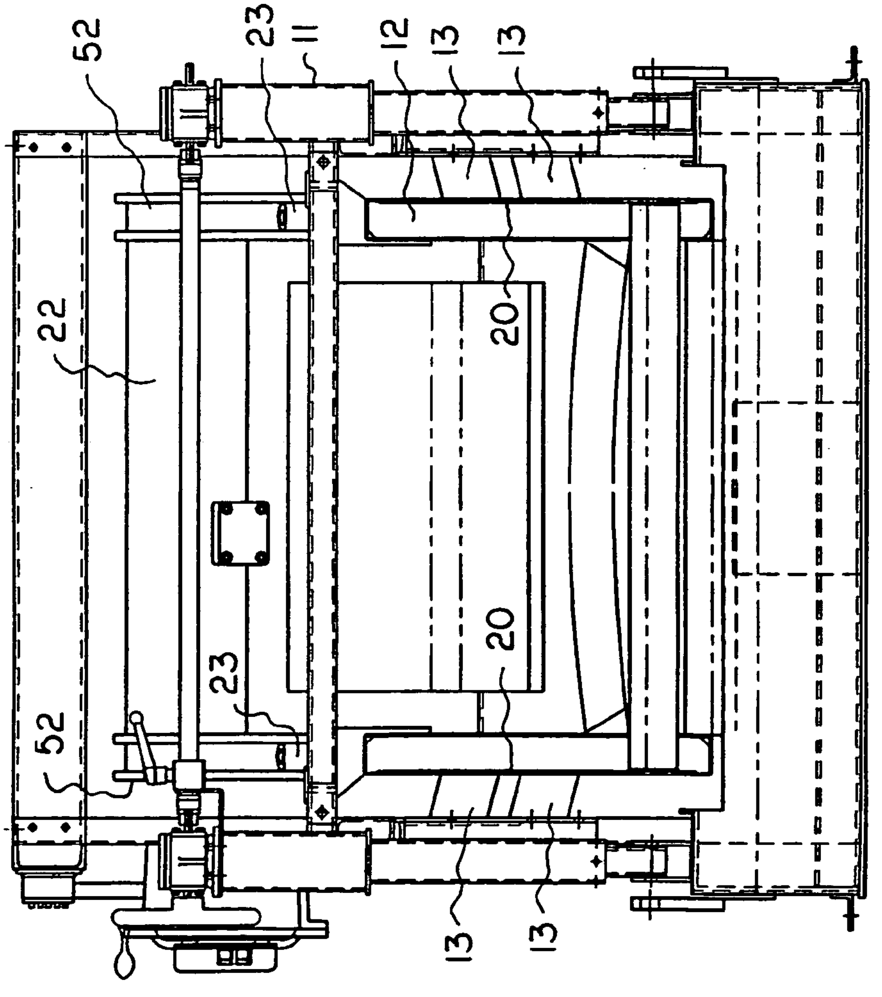
FIG. 2 is an end elevational view taken substantially in the direction of arrows 2-2 of FIG. 1.

The improved vibratory screening machine 10 of the present invention includes an outer stationary frame 11 mounting an inner movable frame 12 by means of a plurality of resilient mounts 13 extending between a plurality of sites between the inner and outer frames, as is well known in the art. Relative to each resilient mount 13 (FIG. 2A), two bolts 14 extend through bores, not numbered, in side plate 15 of the outer frame and thread into a metal plate 17 which is bonded to one side of the resilient cylindrical member 16, and two bolts 19 extend through bores in an associated side plate 20 of movable frame 12 and are received in threaded bores of plate 21 bonded to resilient cylindrical member 16. The foregoing structure is conventional in the art. As can be seen from FIG. 2, the resilient mounts 13 are positioned between opposite sides of the movable frame 12 and the fixed frame 11. Also, FIG. 1 shows four resilient mounts 13 on one side of the vibratory screening machine, and there are four resilient mounts on the opposite side. As is well known in the art, the inner movable frame has a bed 18 on which vibratory screens are removably mounted.

In accordance with the present invention, a single motor 22 is mounted on rails 23 of inner frame 12 by unique mounting structure to provide the desired linear vibratory motion thereto. In the foregoing respect, a fist bracket 24 (FIGS. 3, 6, 7, 8) includes a base 25 having spaced bores 27 therein which receive bolts 29 which secure each fist bracket 24 to a rail 23 of inner frame 12. Except for the cutaway portion 59 of fist bracket housing 36, the fist bracket is a prior art product, but insofar as known was never previously used as part of a structure for mounting a vibratory motor of a vibratory screening machine.

A bushing 30 (FIGS. 12 and 13) is mounted within fist bracket 24, and it includes an outer substantially cylindrical metal housing 31 having keyways 32 therein, and a key 33 (FIG. 12) extends into the lowermost keyway 32 of the bushing housing 36 and the keyway 34 (FIG. 6) in fist bracket housing 36 to orient the bushing housing 31 within the fist bracket housing 36. Two bolts 35 extend through openings 37 in upper portion 39 of fist bracket housing 36 and are threadably received in threaded bores 38 of the fist bracket housing. When the bushing 30 is properly positioned within fist bracket housing 36 and the bolts 35 are tightened, the bushing will be securely clamped in position.

Figure 12:
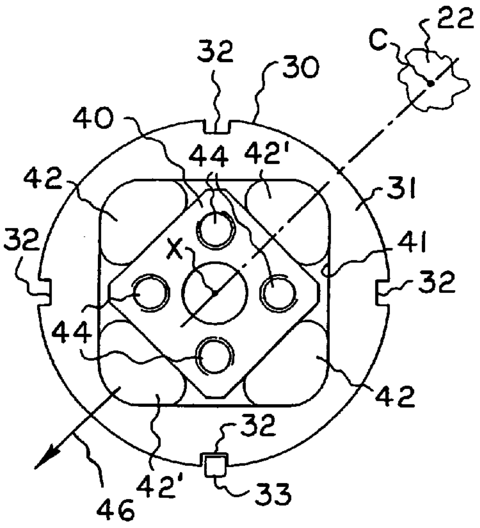
FIG. 12 is an end elevational view showing the resilient bushing construction which fits into the fist bracket and also showing schematically the alignment of the center of the vibratory motor with the center of the bushing and with the centers of aligned resilient members of the bushing.
Figure 13:
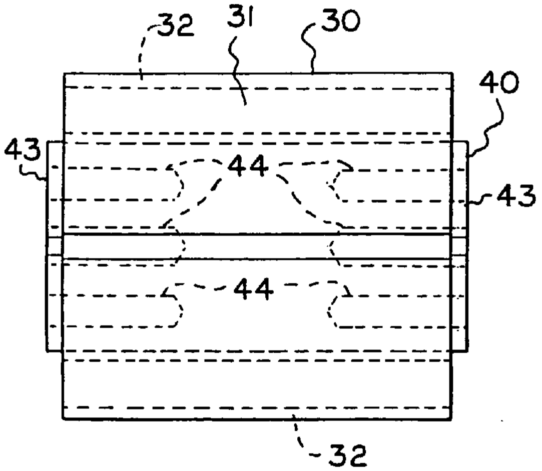
FIG. 13 is a side elevational view of the resilient bushing of FIG. 12.

Bushing 30 includes an elongated metal block 40 of substantially square cross section within opening 41 of bushing housing 31. It is held in position by two compressed resilient members 42 and two compressed resilient members 42', as shown in FIG. 12. Resilient members 42 and 42' are identical and of uniform cross section throughout their lengths and they extend the entire length of bushing housing 31. The ends 43 of metal block 40 extend outwardly beyond the bushing housing 30 (FIG. 13). Tapped bores 44 extend into opposite sides of metal block 40. Bushing 30 is a commercially obtainable device. Bushing 30 is directionally stiff in the direction of arrow 46 which is the direction of the desired conveyance of the material on the screen of machine 10, and when vibratory motor 22 is in operation, this feature produces linear motion. In the present instance the arrow 46 extends at an angle of 45 to the screen bed of the machine 10. However, this angle may vary with different machines.

Figure 10:
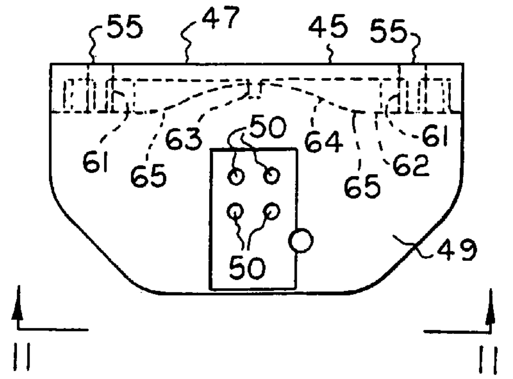
FIG. 10 is a side elevational view of the motor mount bracket.
Figure 11:
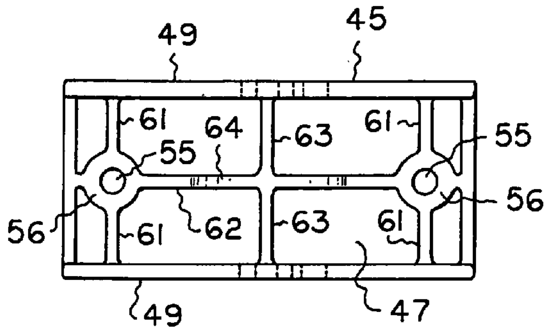
FIG. 11 is a view of the motor mount bracket taken substantially in the direction of 11-11 of FIG. 10.

After the bushing 30 has been clamped in position within fist bracket 24, a motor mount bracket 45 (FIGS. 9-11) is bolted to block 40. In this respect, the motor mount bracket 45 includes a base 47 and two substantially parallel spaced sides 49 extending from base 47. Each side 49 has four bores 50 therein. Bolts 51 (FIG. 4) extend through bores 50 in the sides 49 of the motor mount bracket 45 and are threadably received in tapped bores 44 of metal block 40 of bushing 30 to thereby mount the motor mount bracket 45 on the fist bracket 24. A motor mount bracket 45 is mounted on each fist bracket 24. The opposite ends 52 of motor 22 are bolted to the spaced motor mount brackets 45 mounted on rails 23. In this respect, each end of motor 22 has two base portions 53. Bolts 54 extend through base portions 53 and through bores 55 in the base 47 of each motor mount bracket 45 to thereby securely fasten the ends of motor 22 to spaced motor mount brackets 45. Bosses 56 surround bores 55 on the inner side of base 47 to provide good support for bolts 54. Bosses 56 are of the same height as adjacent portions of ribs 61 and 62.

In accordance with the present invention, the foregoing mounting of the single vibratory motor produces linear motion. In this respect, the center of rotation C (FIGS. 3 and 12) of the vibratory motor 22 is aligned with the center X of bushing 30 and with the centers of the two directionally stiff resilient members 42'. Thus, when the unbalance of the vibratory motor 22 is in line with the line passing through the center of rotation C of motor 22 and the center X of bushing 30 and the centers of resilient members 42', the conveyance direction 46 (FIG. 12) will be realized to produce the desired linear motion. Preferably, the centers C and X and those of resilient members 42' and the direction of conveyance 46 will pass through the center of gravity of the movable frame 12, but it need not be so. If it does not pass through, there will be a change in the conveyance angle. The main consideration is that when the unbalance of the rotating rotor of the motor is in line with the center of rotation C and the center X, linear motion will be produced because resilient members 42' of bushing 30 will be directionally stiff in the direction 46. When the unbalance of the rotating rotor of the vibratory motor is not in line with centers C and X, the resilient members 42 and 42' will be distorted in torsion to thereby cause the thrusts of the vibratory motor to be attenuated in directions transverse to the line between centers C and X, thereby effectively eliminating orbital motion. It will be appreciated that there may be mounting structures where the directional stiffness of the resilient members may not be aligned with the center of the bushing. Therefore, the critical aspect of the mounting structure for obtaining linear motion is that the center of rotation C of the rotor of the vibratory motor should be aligned with the direction of the directional stiffness of the resilient members of the bushing, which is represented by arrow 46 which has been designated above as the direction of conveyance. In other words, the direction of the directional stiffness should pass through the center of rotation C of the rotor of the vibratory motor 22 whether or not it passes through the physical center X of the bushing.

In addition to the foregoing geometry which produces the desired linear motion, each fist bracket 24 and motor mount bracket 45 is configured so as to cause center of rotation C of motor 22 to be as close as possible to the center x of bushing 30. The minimizing of this distance tends to decrease a pendulum effect created by the vibration of the motor relative to the center X of bushing 30 to thereby cause a greater amount of its thrust to be directed in the desired direction of conveyance of the material being screened, which gives rise to greater G forces applied to the inner frame than if the center of motor 22 was further away from the center X of bushing 30. In this respect, as can be seen from FIGS. 6, 7 and 8, each fist bracket housing 36 has a circumferential portion 57 which is cut away at 59 to provide a thinner wall between two spaced portions 60 and 60' of the fist housing wall 36 which are thicker. In addition, the base 47 of motor mount bracket 45 has a plurality of ribs 61, 62 and 63 which lend strength to base 47 while permitting the base to be relatively thin and relatively light weight to lessen the forces due to the pendulum effect. In the foregoing respect, ribs 61 extend crosswise of base 47 at bores 55. A rib 62 extends lengthwise between bores 55 which are located in bosses 56 which are of the same height as the adjoining portions of ribs 61 and 62. Ribs 63 extend crosswise of base 47 outwardly from rib 62. Rib 62 is cut away at 64 (FIG. 10), and the cutaway 64 extends between points 65. Thus, when the motor mount brackets 45 are mounted on fist brackets 24, the cutaway portions 59 of fist brackets 24 will lie within the cutaway portions 64 of ribs 62 of motor mount brackets 45 to thereby minimize the distance between center C and center X. Thus, because of the thinness of the bases 47 of motor mount brackets 45 and the cutaway portions 59 of the fist brackets 24 and the cutaway portions 64 of ribs 62, the center C of motor 22 will lie closer to the center X of bushing 30 than if there were no cutaway portions 59 and no cutaway portions 64. Thus, positioning the base portions 53 of motor 22 closer to center X of bushing 30 by virtue of the cutaway portions 59 and 64, will reduce the pendulum affect which vibratory motor 22 will otherwise produce, and as noted above, the reduction of the pendulum effect will cause a greater thrust of motor 22 to be transmitted to inner frame 12 which in turn results in higher G forces than if the motor 22 was further away. The pendulum effect is produced when the unbalance of the vibratory motor is not being exerted in line with centers C and X and acts through a lever arm extending between center X and the distance to the unbalance. Therefore, the shorter the lever arm, the less will be the pendulum effect.

In addition to the foregoing, the motor mount brackets 45 are preferably fabricated of cast aluminum to thereby cause them to weigh less than if they were made out of conventional cast iron or steel. The above described rib structure of motor mount brackets 45, when in cast aluminum, increases their strength so that they can withstand the loads to which they are subjected. Additionally, considering that the weight of motor mount brackets 45, when in aluminum, is less than their weight in either steel or cast iron, this also reduces the pendulum affect. Preferably the fist brackets are fabricated of cast iron.

In the above portions of the specification reference was made to the unbalance of a vibratory motor. This is usually achieved by mounting an eccentric weight on the rotor, but it can be achieved in other ways.

While preferred embodiments of the present invention have been disclosed, it will be appreciated that it is not limited thereto but may be otherwise embodied within the scope of the following claims.

The invention claimed is:

1. A motor and bracket combination comprising:

a motor;

a first bracket with a first base and a clamping portion extending from said first base, said clamping portion having an aperture, a relatively thin walled portion disposed between a pair of relatively thick walled portions, and an outer surface comprising a supporting surface on said thin walled portion;

a second bracket having a second base with a top surface and a bottom surface, wherein said bottom surface engages said supporting surface of said first bracket; and a bushing disposed through said aperture of said first bracket.

2. The motor and bracket combination of claim 1 wherein said second bracket further comprises a first and second side extending from said second base.

3. The motor and bracket combination of claim 2 wherein said bushing is placed between said first and second side of said second bracket.

4. The motor and bracket combination of claim 1 wherein said motor is mounted to said top surface of said second base of said second bracket.

5. The motor and bracket combination of claim 1 wherein said supporting surface is substantially planar, and wherein a plane that is parallel with said substantially planar supporting surface intersects said first base at an acute angle.

6. The motor and bracket combination of claim 1 wherein said supporting surface is substantially planar, and wherein a plane that is parallel with said substantially planar supporting surface intersects said first base at an angle that is approximately forty-five degrees.

7. The motor and bracket combination of claim 1 wherein said bushing is directionally stiff.

8. The motor and bracket combination of claim 2 wherein said second bracket has at least one rib on said bottom surface.

9. The motor and bracket combination of claim 8 wherein said at least one rib extends longitudinally of said second base and includes a cutaway portion.

10. The motor and bracket combination of claim 9 including spaced bores in said second base in substantial alignment with said longitudinally extending rib, and bosses on said bottom surface of said second based surrounding said bores.

11. The motor and bracket combination of claim 9 including a plurality of second ribs on said bottom surface of said second base extending transversely to said longitudinally extending rib.

12. The motor and bracket combination of claim 2 wherein said second base has thin walled portions separated by ribs.

13. The motor and bracket combination of claim 2 wherein said second base has thin walled and thick walled sections.

14. The motor and bracket combination of claim 1 wherein said second bracket is bolted to said bushing.

* * * * *